United States Patent [19]

Kokotailo et al.

[11] 4,415,544

[45] Nov. 15, 1983

[54] MODIFICATION OF CATALYTIC ACTIVITY OF POROUS ZEOLITES

[75] Inventors: George T. Kokotailo, Woodbury; Albert C. Rohrman, Jr., Gibbstown; Stephen Sawruk, Woodbury, all of N.J.

[73] Assignee: Mobil Oil Corporation, New York, N.Y.

[21] Appl. No.: 382,830

[22] Filed: May 27, 1982

[51] Int. Cl.³ .................... C01B 33/28; B01J 29/06
[52] U.S. Cl. ........................................ 423/328; 502/60
[58] Field of Search ............... 423/328, 329; 252/442, 252/441, 455 Z

[56] References Cited

U.S. PATENT DOCUMENTS

| | | | |
|---|---|---|---|
| 3,437,587 | 4/1969 | Ellert et al. | 252/455 Z |
| 3,630,965 | 12/1971 | Voorhies et al. | 252/442 |
| 3,702,312 | 11/1972 | Wilson | 252/442 |
| 3,702,886 | 12/1972 | Argaver et al. | 423/328 |
| 4,054,511 | 10/1977 | Miale et al. | 252/442 |
| 4,088,605 | 5/1978 | Rollmann | 252/455 Z |

*Primary Examiner*—Edward J. Meros
*Attorney, Agent, or Firm*—Alexander J. McKillop; Michael G. Gilman; Dennis P. Santini

[57] ABSTRACT

A method is provided for effectively tailoring the catalytic activity of porous crystalline zeolites. The method involves loading all channels of a cationic form of the porous zeolite with molten wax, contacting the wax-loaded zeolite with hydrogen fluoride solution in a controlled manner, and calcining the hydrogen fluoride solution contacted zeolite.

9 Claims, No Drawings

MODIFICATION OF CATALYTIC ACTIVITY OF POROUS ZEOLITES

CROSS-REFERENCE TO RELATED CASES

This application is related by subject matter to applications Ser. Nos. 382,829 and 382,892 filed on the same date herewith.

BACKGROUND OF THE INVENTION

1. Field of the Invention

This invention relates to a method for altering the surface catalytic activity of a porous crystalline zeolite (e.g. of the ZSM-5 type) in the cationic, e.g. hydrogen, form which involves the sequential steps of loading said zeolite with molten paraffinic wax sufficient to block all channels thereof, contacting the wax-loaded zeolite with hydrogen fluoride solution, and then calcining the hydrogen fluoride solution contacted zeolite.

2. Description of Prior Art

The use of zeolites as catalyst components is well known. Nevertheless, zeolites have been the subject of extensive investigations to improve their catalytic properties. Zeolites ZSM-5 and ZSM-11, for example, are fully described in U.S. Pat. Nos. 3,702,886 and 3,709,979, respectively, wherein it is disclosed that because of their ordered, porous structure, creating small interconnected cavities, they are selective toward certain molecules and provide catalytic capabilities for various chemical conversion reactions. U.S. Pat. Nos. 4,088,605 and 4,148,713 disclose a process combination wherein zeolites of the ZSM-5 type have their outer shells altered so as to be essentially aluminum-free, leading to a more selective catalyst. However, no known art discloses or suggests modifying the surface of porous zeolites such as those of ZSM-5 type by altering their surfaces and the alpha activity of the surfaces and thereby altering their catalytic properties by the present method.

It is noted that U.S. Pat. Nos. 3,354,078 and 3,644,220 relate to treating crystalline aluminosilicates with volatile metal halides. Neither of these latter patents, however, is concerned with altering surface activity of porous zeolites such as ZSM-5 type in the cationic form as in the present method. In fact, the use of hydrogen fluoride with aluminosilicates has been avoided because of resulting lattice damage. Hydrogen fluoride in high concentrations, e.g., 5 N or greater, readily attacks both silica and alumina. Lower concentrations may also damage lattice structures if contact is maintained for too long a time. With some zeolitic materials, hydrogen fluoride treatment under controlled conditions has been used to alter pore size. U.S. Pat. Nos. 3,997,474 and 4,054,511 relate to altering effective pore size of natural ferrierite ore with very dilute hydrogen fluoride treatment. When the same treatment of erionite was conducted, a large loss in activity and crystallinity resulted.

SUMMARY OF THE INVENTION

The present invention relates to a novel method for altering catalytic activity of cationic forms of certain porous crystalline zeolites, e.g., HZSM-5 and HZSM-11, which comprises the sequential steps of (1) loading said crystalline zeolite with molten paraffinic wax sufficient to block all channels thereof, (2) cooling the wax-loaded crystalline zeolite sufficiently to cause the wax to solidify, (3) contacting the wax-loaded crystalline zeolite with hydrogen fluoride solution under specific conditions of solution concentration, time, temperature and pressure, and (4) calcining the hydrogen fluoride solution contacted zeolite.

The resulting activity modified zeolite has a surface with a designed lower alpha activity than the interior of the zeolite. It also exhibits an X-ray diffraction pattern with a series of lines of increased breadth and decreased intensity when compared with the same zeolite which has not been altered by the present method.

The resulting zeolite also has improved selectivity and other catalytic properties when compared with the same zeolite which has not been altered by the present method. In fact, the severity of the second step of the present method may be varied within the given limits to provide specific selectivity for specified catalytic applications. For example, if the severity of the second step is controlled so that the alpha activity of the surface of the treated zeolite is in the range of from 50 to 150, catalytic performance for hydrodewaxing of petroleum distillates is considerably improved.

DESCRIPTION OF SPECIFIC EMBODIMENTS

The novel method of the present invention is concerned with the manufacture of porous synthetic crystalline zeolites, especially of the ZSM-5 type, e.g., ZSM-5, ZSM-11, ZSM-12, ZSM-23, ZSM-35, ZSM-38 and ZSM-48, with unusual and desired catalytic properties.

The crystalline zeolites to be modified by the present invention may be synthesized from reaction mixtures containing various ion sources, including alkylamines and diamines wherein alkyl is from 1 to 20 carbon atoms, onium compounds and compounds containing multiple cationic centers. Onium compounds which may be used include those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g., nitrogen, phosphorus, arsenic, antimony or bismuth) or a heteroatom (e.g., N, O, S, Se, P, As, etc.) in an alicyclic, heteroalicyclic or heteroaromatic structure; and X is an anion (e.g., fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

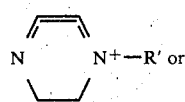

or

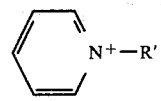

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms. Compounds containing multiple cationic centers which may be used include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$$[(CH_3)_3As^+(CH_2)_6N^+(CH_3)_3](Cl^-)_2,$$

$$[(C_3H_7)_3N^+(CH_2)_{10}N^+(C_3H_7)_3](Cl^-)_2,$$

$$[(C_6H_5)_3N^+(C_2H_4)_{16}P^+(C_6H_5)_3](OH^-)_2,$$
$$[(C_{18}H_{37})_3P^+(C_2H_2)_3P^+(CH_3)_3](Cl^-)_2,$$

$$[(C_2H_5)_3N^+(C_6H_4)N^+(C_2H_5)_3](Br^-)_2,$$

$$[(CH_3)_3Sb^+(CH_2)_{10}Sb^+(CH_3)_3](Cl^-)_2,$$

$$[(C_6H_5)_3Sb^+(CH_2)_4N^+(CH_3)_3](OH^-)_2,$$

$$[(CH_3)_3Bi^+(CH_2)_{18}N^+(CH_3)_3](Br^-)_2,$$

$$[(C_2H_3)_3N^+(CH_2)_{50}N^+(C_2H_3)_3](OH^-)_2,$$

$$[(C_6H_5)_3P^+(C_2H_2)_6As^+(CH_3)_3](Cl^-)_2,$$

$$[(CH_3)_3N^+(CH_2)_6N^+(CH_3)_3](Cl^-)_2,$$

and

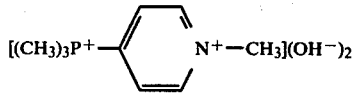

With regard to the porous zeolite materials, the components of the respective synthesis reaction mixtures as well as the synthesis conditions are given in the patents covering said materials to be manufactured by the present method. These mixtures and conditions are shown in U.S. Pat. Nos. 3,702,886 and Re. 29,948 for ZSM-5, the entire contents of each being incorporated herein by reference. For ZSM-11 the mixture and conditions are shown in U.S. Pat. No. 3,709,979, the entire contents of which is incorporated herein by reference. The mixtures and conditions for ZSM-12 synthesis are described in U.S. Pat. No. 3,832,449, the entire contents of which are incorporated herein by reference. For ZSM-23, U.S. Pat. No. 4,076,842 shows the mixtures and conditions and the entire contents thereof is incorporated herein by reference. The entire contents of U.S. Pat. No. 4,016,245 and 4,046,859, describing the mixtures and conditions for synthesis of ZSM-35 and ZSM-38, respectively, are also incorporated herein by reference.

ZSM-48 can be identified, in terms of moles of anhydrous oxides per 100 moles of silica as follows:

(0.05 to 5) $N_2O$:(0.1 to 10)$M_{2/n}O$:(0 to 4)$Al_2O_3$:(100)$SiO_2$ wherein M is at least one cation having a valence n, N is a mixture of a $C_2-C_{12}$, and more preferably of a $C_3-C_5$, alkylamine and a tetramethylammonium compound and wherein the composition is characterized by the distinctive X-ray diffraction pattern as shown below:

| Characteristic Lines of Zeolite ZSM-48 | |
|---|---|
| d (A) | Relative Intensity (I/Io) |
| 11.8 ± 0.2 | S |
| 10.2 ± 0.2 | W-M |
| 7.2 ± 0.15 | W |
| 4.2 ± 0.08 | VS |
| 3.9 ± 0.08 | VS |
| 3.6 ± 0.06 | W |
| 3.1 ± 0.05 | W |
| 2.85 ± 0.05 | W |

These values were determined by standard techniques. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$, where $I_o$ is the intensity of the strongest line or peak, and d (obs.), the interplanar spacing in Angstroms (A) corresponding to the recorded lines, were calculated. In the foregoing table the relative intensities are given in terms of the symbols VS=very strong, S=strong, W=weak, and W-M=weak-to-medium (depending on the cationic form). Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

ZSM-48 can be prepared from a reaction mixture containing a source of silica, tetramethylammonium compound, $C_2-C_{12}$ alkylamine, an alkali metal oxide, e.g. sodium, with or without a source of alumina, and water, and having a composition, in terms of mole ratios of oxides, falling within the following ranges:

| REACTANTS | BROAD | PREFERRED |
|---|---|---|
| $Al_2O_3/SiO_2$ | 0 to 0.08 | 0 to 0.02 |
| $Na_2O/SiO_2$ | 0.01 to 1.0 | 0.1 to 0.5 |
| $N_2O/SiO_2$ | 0.005 to 0.5 | 0.005 to 0.25 |
| $OH^-/SiO_2$ | 0.01 to 0.5 | 0.05 to 0.2 |
| $H_2O/SiO_2$ | 10 to 200 | 20 to 100 | wherein N is a mixture of a $C_2-C_{12}$ alkylamine and tetramethylammonium compound, and maintaining the mixture at 80°-200° C. until crystals of ZSM-48 are formed.

The molar ratio of $C_2-C_{12}$ alkylamine to tetramethyl ammonium compound is not usually narrowly critical and can range from 1:1 to 10:1. The tetramethylammonium compound can include the hydroxide or halide with the chloride being particularly preferred.

The porous zeolites to be modified in accordance herewith will be in a cationic form, such as, for example, the hydrogen form. They may be produced in this form by known methods of calcining the synthesized organic cation containing form or by ion exchange followed by calcination. Representative ion exchange techniques are disclosed in U.S. Pat. Nos. 3,140,249; 3,140,251; and 3,140,253. Such techniques would include contacting the subject zeolite with a salt of the desired replacing cation or cations. Said salts include by way of example the chlorides, nitrates and sulfates. Following contact with the salt solution of the desired replacing cation, the zeolite is then, preferably, washed with water and dried at a temperature of from about 65° C. to about 815° C. for a time of from about 1 hour to about 48 hours or more. This may, if desired, be followed or replaced by calcination of the zeolite at a temperature of from about 200° C. to about 600° C. in the presence of an inert atmosphere for a time of from about 10 minutes to about 48 hours.

The first step of the present method involves contacting the cationic form of the porous crystalline zeolite with molten paraffinic wax sufficient to effectively block all pores and channels of the zeolite. This wax loading step may be accomplished at a temperature sufficient to retain the wax in the molten state, e.g., from about 40° C. to about 100° C. depending upon the wax used. The wax may be a paraffinic hydrocarbon wax of from about 20 to about 35 carbon atoms. For example, if the wax is a $C_{20}$, the required temperature is 40° C. or higher; if the wax is a $C_{35}$, the required temperature is 75° C. or higher.

The first step of wax loading may be accomplished by, for example, obtaining a sample of zeolite ZSM-5 synthesized as in U.S. Pat. No. 3,702,886 and treated by calcining at 500° C. for 4 hours, cation exchanging by contact with 1 N $NH_4Cl$ at 100° C. for 4 hours, washing with water, filtering, drying at 130° C. and then calcining at 500° C. for 4 hours, followed by mixing the cationic form of ZSM-5 (i.e. HZSM-5) with sufficient paraffinic wax to fill the pores thereof. The mixture is then heated to a temperature within the range of from 40° C. to 100° C., i.e. above the melting point of the wax used, and held there until the pores of the zeolite become loaded with the wax.

The second step of the present method involves reducing the temperature of the wax-loaded zeolite sufficiently to render the molten wax solid within the pores and channels of the zeolite. The temperature for this step need be just below the melting point of the wax used.

The third step of the present method involves contacting the wax-loaded crystalline zeolite product from the second step with an aqueous hydrogen fluoride solution of from about 0.005 to about 0.5 Normal at a temperature of from about 20° C. to about 35° C. and a pressure of from about atmospheric to about 40 psig for a contact time of from about 1 hour to about 10 hours. In terms of grams of zeolite/grams of hydrogen fluoride for the second step contacting, a range of from about 1/0.01 to about ½ must be maintained within the further conditions of temperature, pressure and time above given. The conditions of this step of the present method are critical and accurate control thereof within the above ranges is useful for tailoring the final activity of the zeolite for specific applications. The temperature must not be high enough to remove the wax blockage of channels created in the first and second steps. For example, if the zeolite altered hereby is intended for use in a catalyst for hydrodewaxing a petroleum fraction, such as, for example, a distillate, the activity thereof, measured by Alpha Value, should be within the range of from about 50 to about 150, with about 100 being essentially optimum. If the catalyst comprising the altered zeolite is to be used to convert ethylbenzene, the Alpha Value of the zeolite should be within the range of from about 30 to about 50, with an Alpha Value of about 40 being essentially optimum. The conditions of this second step of the present method determines the degree of Alpha Value modification.

The tailored structural activity by way of the third step actually changes the zeolite structure in a way which provides altered catalytic activity and improved stability of the final catalyst for the desired chemical conversion process, e.g., hydrodewaxing, ethylbenzene conversion, etc. For instance, a mild treatment under the third step of the present method will produce a final activity-modified zeolite, e.g., HZSM-5, with changed X-ray diffraction pattern. The change will be some reduced intensity and broader lines indicating structural modification. Zeolite HZSM-5 subjected to mild second step hydrogen fluoride treatment, on aging, the orthorhombic structure transforms to the tetragonal form providing a highly active and stable catalyst.

The fourth step of the method involves calcining the product zeolite of the third step. This will be accomplished by heating the same at a temperature within the range of from about 200° C. to 600° C. in an inert atmosphere of air, nitrogen, etc. at atmospheric, superatmospheric or subatmospheric pressure for between 10 minutes and 48 hours.

If desired, the porous crystalline zeolite material having altered catalytic activity by way of the present method may be subjected to ion exchange as above defined followed by calcination. This further step may be utilized to additionally enhance or tailor catalytic activity for a particular chemical conversion objective.

Porous zeolites to be tailored by the present method may be characterized as having a porous crystal structure which provides constrained access to and egrees from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful in this invention possess, in combination, a silica to alumina ratio of at least about 12, and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in any binder or in cationic or other form within the channels. Although zeolites with a silica to alumina ratio of at least 12 are useful, it is preferred to use such zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the chemical conversions to be conducted with the final product zeolites.

Porous crystalline zeolites usefully tailored by this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although, in some instances, excessive puckering or pore blockage may render these catalysts ineffective. Twelve-membered rings do not generally appear to offer sufficient constraint to produce the advantageous conversions, although puckered structures exist such as TMA offretitte which is a known effective zeolite. Also, structures can be conceived, due to pore blockage or other cause, that may be operative.

Rather than attempt to judge from crystal structure whether or not a particular zeolite possesses the necessary constrained access, a simple determination of the "constraint index" may be made by passing continuously a mixture of an equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and placed in a glass tube. Prior to testing, the zeolite is treated with a stream of air at about 538° C. for at least 15 minutes. The zeolite is then flushed with helium and the temperature adjusted between about 288° C. and 510° C. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons. The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (CI) values for some typical zeolites are:

| Zeolite | CI |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| ZSM-48 | 3.4 |
| TMA Offretite | 3.7 |
| Beta | 0.6 |
| H—Zeolon (mordenite) | 0.4 |
| REY | 0.4 |
| Amorphous Silica-Alumina | 0.6 |
| Erionite | 38 |

In a preferred aspect of this invention, the zeolites modified hereby are selected as those providing among other things a crystal framework density, in the dry hydrogen form, of not less than about 1.6 grams per cubic centimeter. It has been found that zeolites which satisfy all three of the discussed criteria are most desired for several reasons. When hydrocarbon products or by-products are catalytically formed, for examle, such zeolites tend to maximize the production of gasoline boiling range hydrocarbon products. Therefore, the preferred zeolites useful with respect to this invention are those having a Constraint Index as defined above of about 1 to about 12, a silica to alumina mole ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article ZEOLITE STRUCTURE by W. M. Meier. This paper, the entire contents of which are incorporated herein by reference, is included in PROCEEDINGS OF THE CONFERENCE ON MOLECULAR SIEVES, (London, April 1967) published by the Society of Chemical Industry, London, 1968.

When the crystal structure is unkown, the crystal framework density may be determined by classical pycnometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

It is possible that the unusual sustained activity and stability of this special class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

| | Void Volume | Framework Density |
| --- | --- | --- |
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

In practicing a particularly desired chemical conversion process, it may be useful to incorporate the crystalline zeolite modified in accordance herewith with a matrix comprising another material resistant to the temperature and other conditions employed in the process. Such matrix material is useful as a binder and imparts greater resistance to the catalyst for the severe temperature, pressure and reactant feed stream velocity conditions encountered in, for example, many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites modified hereby may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely with the modified zeolite content ranging from about 1 to about 99 percent by weight and more usually from about 5 to about 80 percent by weight of the dry composite.

The activity altered zeolites prepared by the present method are useful as catalyst components for various organic compound, e.g., hydrocarbon compound, conversion reactions. Such reactions include, as non-limiting examples, toluene disproportionation, wherein the reaction conditions include a temperature of from about 450° C. to about 540° C., a pressure of from about 400 psig to about 600 psig and a weight hourly space velocity of from about 2 to about 4; and lube oil dewaxing, wherein the reaction conditions include a temperature of from about 285° C. to about 370° C., a pressure of from about 300 psig to about 500 psig and a weight hourly space velocity of from about 0.5 to about 1; and vapor phase xylenes isomerization, wherein the reaction conditions include a temperature of from about 230° C. to about 485° C., a pressure of from about 50 psig to about 500 psig, a weight hourly space velocity of from about 0.1 to about 200 and a hydrogen/hydrocarbon mole ratio of from about 0 to about 100. In general, therefore, such organic compound conversion reactions may be said to require a temperature of from about 230° C. to about 540° C., a pressure of from about 50 psig to about 600 psig, a weight hourly space velocity of from about 0.1 to about 200 and a hydrogen/hydrocarbon mole ratio of from about 0 to about 100.

The following examples will illustrate the novel method of the present invention.

EXAMPLE 1

A quantity of zeolite ZSM-5 was synthesized by the method taught in U.S. Pat. No. 3,702,886. It was calcined at 500° C. for 4 hours to provide the hydrogen cation form, i.e. HZSM-5. The Alpha Value of this zeolite was 242.

EXAMPLE 2

Desiring to tailor a zeolite having an Alpha activity of closer to 100, a 2 gram sample of the HZSM-5 from Example 1 was mixed with 0.5 grams of paraffin wax (composed of 30 carbon atom paraffins) and the mixture heated to 75° C. for one-half hour. The wax-loaded zeolite was then cooled to room temperature and mixed with a 0.1 N aqueous solution of hydrogen fluoride (1 grams HF and 500 grams $H_2O$). The mixture was slurried for 3 hours at room temperature (24° C.) and atmospheric pressure. The mixture was filter separated and the hydrogen fluoride solution replaced for further slurrying at room temperature and atmospheric pressure for 3 hours. The mixture was again filter separated and the zeolite washed with water at room temperature and dried at 130° C. The hydrogen fluoride contacted zeolite was then calcined for 4 hours at 500° C. The Alpha Value of this treated zeolite was 112.

As is known in the art, the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (rate constant=0.016). The Alpha Test is described in U.S. Pat. No. 3,354,078 and in The Journal of Catalysis, Vol. IV, pp. 552–529 (August 1965).

What is claimed is:

1. A method for altering catalytic activity of the cationic form of a porous crystalline zeolite which comprises the sequential steps of loading all pores and channels of said zeolite with a paraffinic wax, contacting the wax loaded zeolite with an aqueous hydrogen fluoride solution of from about 0.005 Normal to about 0.5 Normal at a temperature of from about 20° C. to about 35° C. and a pressure of from about atmospheric to about 40 psig for a contact time of from about 1 hour to about 10 hours, and calcining the hydrogen fluoride solution contacted zeolite at a temperature of from about 200° C. to about 600° C.

2. The method of claim 1 wherein said wax loading is accomplished by contacting said zeolite with molten paraffinic wax under conditions sufficient to maintain the wax in the molten state and to effectively block all pores and channels of said zeolite, and then cooling said wax loaded zeolite sufficiently to solidify the wax within all pores and channels of said zeolite.

3. The method of claim 1 wherein said crystalline zeolite is characterized by a silica/alumina mole ratio of at least 12.

4. The method of claim 3 wherein said cystalline zeolite is selected from the group consisting of ZSM-5, ZSM-11, ZSM-12, ZSM-23 ZSM-35, ZSM-38 and ZSM-48.

5. The method of claim 4 wherein said crystalline zeolite is ZSM-5.

6. The method of claim 1 wherein said wax is a paraffinic hydrocarbon of from about 20 carbon atoms to about 35 carbon atoms.

7. The method of claim 1 which includes the further steps of ion exchanging the calcined hydrogen fluoride solution contacted zeolite and thereafter calcining the ion exchanged zeolite at a temperature of from about 200° C. to about 600° C.

8. A method for altering catalytic activity of the cationic form of a porous crystalline zeolite characterized as having a structure which provides constrained access to and egress from the intracrystalline free space by virtue of having a pore dimension greater than about 5 Angstroms and pore windows of about a size such as would be provided by 10-membered rings of oxygen atoms, which comprises the sequential steps of loading the pores and channels of said zeolite with a paraffinic wax, contacting the wax loaded zeolite with an aqueous hydrogen fluoride solution of from about 0.005 Normal to about 0.5 Normal at a temperature of from about 20° C. to about 35° C. and a pressure of from about atmospheric to about 40 psig for a contact time of from about 1 hour to about 10 hours, and calcining the hydrogen fluoride solution contacted zeolite at a temperature of from about 200° C. to about 600° C.

9. A method for altering catalytic activity of the cationic form of a porous crystalline zeolite characterized by a Constraint Index of from about 1 to about 12 and a silica/alumina mole ratio of at least 12, whch comprises the sequential steps of loading the pores and channels of said zeolite with a paraffinic wax, contacting the wax loaded zeolite with an aqueous hydrogen fluoride solution of from about 0.005 Normal to about 0.5 Normal at a temperature of from about 20° C. to about 35° C. and a pressure of from about atmospheric to about 40 psig for a contact time of from about 1 hour to about 10 hours, and calcining the hydrogen fluoride solution contacted zeolite at a temperature of from about 200° C. to about 600° C.

* * * * *